(12) United States Patent
Shibata et al.

(10) Patent No.: US 8,727,932 B2
(45) Date of Patent: May 20, 2014

(54) HYBRID VEHICLE DRIVE DEVICE

(75) Inventors: Hiroyuki Shibata, Odawara (JP);
Hiroyuki Shioiri, Numazu (JP); Kouhei Miyake, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 149 days.

(21) Appl. No.: 13/520,233

(22) PCT Filed: Oct. 7, 2011

(86) PCT No.: PCT/JP2011/073258
§ 371 (c)(1),
(2), (4) Date: Jul. 2, 2012

(87) PCT Pub. No.: WO2013/051158
PCT Pub. Date: Apr. 11, 2013

(65) Prior Publication Data
US 2013/0109523 A1 May 2, 2013

(51) Int. Cl.
*B60K 6/365* (2007.10)
*B60K 6/383* (2007.10)

(52) U.S. Cl.
USPC ............................................. 475/324; 475/5

(58) Field of Classification Search
USPC ...................... 475/5, 323, 324, 325; 180/372
See application file for complete search history.

(56) References Cited

U.S. PATENT DOCUMENTS

| | | | | |
|---|---|---|---|---|
| 7,128,677 B2 * | 10/2006 | Supina et al. | ............... | 475/5 |
| 7,163,480 B2 * | 1/2007 | Supina et al. | ............... | 475/5 |
| 2012/0265387 A1 * | 10/2012 | Hisada et al. | ............... | 701/22 |
| 2013/0017916 A1 * | 1/2013 | Sada et al. | ............... | 475/5 |

FOREIGN PATENT DOCUMENTS

| | | |
|---|---|---|
| JP | 2001-187535 A | 7/2001 |
| JP | 2003-191760 A | 7/2003 |
| JP | 2009-143348 A | 7/2009 |
| JP | 2010-139052 A | 6/2010 |
| JP | 2010-162969 A | 7/2010 |
| JP | 2010-254230 A | 11/2010 |

OTHER PUBLICATIONS

International Search Report issued Dec. 13, 2011 of PCT/JP2011/073258.

* cited by examiner

*Primary Examiner* — Roger Pang
(74) *Attorney, Agent, or Firm* — Kenyon & Kenyon LLP

(57) ABSTRACT

A hybrid vehicle drive device includes a planetary gear mechanism, a one way clutch, and a torque limiter, wherein a sun gear of the planetary gear mechanism is connected to a first electric rotating machine, a carrier thereof is connected to an engine, and a ring gear thereof is connected to a second electric rotating machine and drive wheels, respectively, the ring gear is disposed on an inner peripheral side of a hollow rotary member as well as connected to drive wheels via counter drive gear disposed on an outer peripheral side of the rotary member, the one way clutch regulates a rotation of the carrier in a negative direction when it is assumed that a rotation direction of the ring gear at the time a hybrid vehicle travels forward is a positive direction, the torque limiter operates in response to transmission torque of the one way clutch and restricts the transmission torque of the one way clutch, and the one way clutch and the torque limiter are disposed inside of the rotary member.

5 Claims, 2 Drawing Sheets

VEHICLE WIDTH DIRECTION (AXIS DIRECTION)

VEHICLE WIDTH DIRECTION (AXIS DIRECTION)

HYBRID VEHICLE DRIVE DEVICE

This is a 371 national phase application of PCT/JP2011/073258 filed 7, Oct. 2011, the entire content of which is incorporated herein by reference.

FIELD

The present invention relates to a hybrid vehicle drive device.

BACKGROUND

Conventionally, a hybrid vehicle drive device which have an electric rotating machine and can perform EV traveling is known. For example, Patent Literature 1 discloses a technology of a hybrid vehicle power transmission device in which a first motor generator and a second motor generator are disposed on separate shafts.

CITATION LIST

Patent Literature

Patent Literature 1: Japanese Patent Application Laid-open No. 2010-139052

SUMMARY

Technical Problem

In a hybrid vehicle, it is preferable to be able to enlarge an EV travel region. For example, in a hybrid vehicle having two electric rotating machines, when the hybrid vehicle can perform EV traveling using both the electric rotating machines as power sources, an EV travel region can be expanded. Further, in a hybrid vehicle, it is preferable to be able to suppress an axial length of a drive device.

An object of the present invention is to provide a hybrid vehicle drive device capable of expanding an EV travel region and suppressing an axial length at the same time.

Solution to Problem

A hybrid vehicle drive device according to the present invention includes a planetary gear mechanism; a one way clutch; and a torque limiter, wherein a sun gear of the planetary gear mechanism is connected to a first electric rotating machine, a carrier thereof is connected to an engine, and a ring gear thereof is connected to a second electric rotating machine and drive wheels, respectively, the ring gear is disposed on an inner peripheral side of a hollow rotary member as well as connected to the drive wheels via a counter drive gear disposed on an outer peripheral side of the rotary member, the one way clutch regulates a rotation of the carrier in a negative direction when it is assumed that a rotation direction of the ring gear at the time a hybrid vehicle travels forward is a positive direction, the torque limiter operates in response to transmission torque of the one way clutch and restricts the transmission torque of the one way clutch, and the one way clutch and the torque limiter are disposed inside of the rotary member.

In the hybrid vehicle drive device, it is preferable that the torque limiter is interposed between the sun gear and the first electric rotating machine.

In the hybrid vehicle drive device, it is preferable that the one way clutch, the planetary gear mechanism, and the torque limiter are sequentially disposed from a side near to the engine in an axis direction of the engine.

In the hybrid vehicle drive device, it is preferable that the torque limiter operates in response to torque transmitted to the carrier via the planetary gear mechanism and restricts the transmission torque of the one way clutch and torque transmitted from the carrier to the engine.

Advantageous Effects of Invention

A hybrid vehicle drive device according to the present invention includes a planetary gear mechanism, a one way clutch, and a torque limiter. A sun gear of the planetary gear mechanism is connected to a first electric rotating machine, a carrier thereof is connected to an engine, and a ring gear thereof is connected to a second electric rotating machine and drive wheels, respectively. The ring gear is disposed on an inner peripheral side of a hollow rotary member as well as connected to drive wheels via a counter drive gear disposed on an outer peripheral side of the rotary member. The one way clutch regulates a rotation of the carrier in a negative direction when it is assumed that a rotation direction of the ring gear at the time a hybrid vehicle travels forward is a positive direction. The torque limiter operates in response to transmission torque of the one way clutch and restricts the transmission torque of the one way clutch. The one way clutch and the torque limiter are disposed inside of the rotary member. Thus, the hybrid vehicle drive device according to the present invention achieves an effect that an expansion of the EV travel region and a suppression of the axial length can be realized at the same time.

DESCRIPTION OF EMBODIMENT

Figure 1:
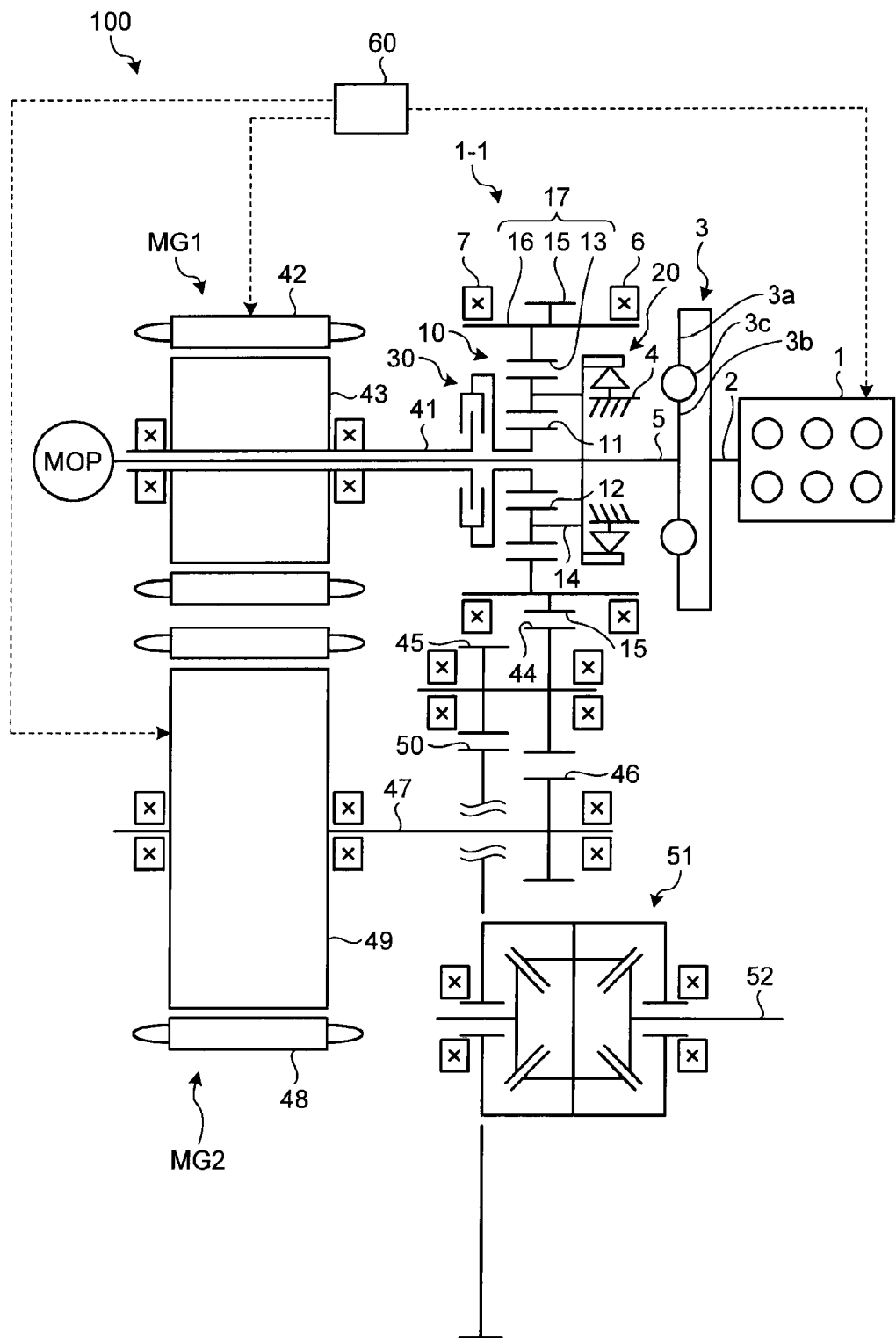
FIG. 1 is a skeleton view illustrating a main portion of a hybrid vehicle according to the embodiment.
Figure 1:

A hybrid vehicle drive device according to an embodiment of the present invention will be explained below in detail referring to the drawings. Note that the present invention is not limited by the embodiment. Further, components in the embodiments include components that can be easily conceived by a person skilled in the art or substantially same components.

Embodiment

Figure 2:
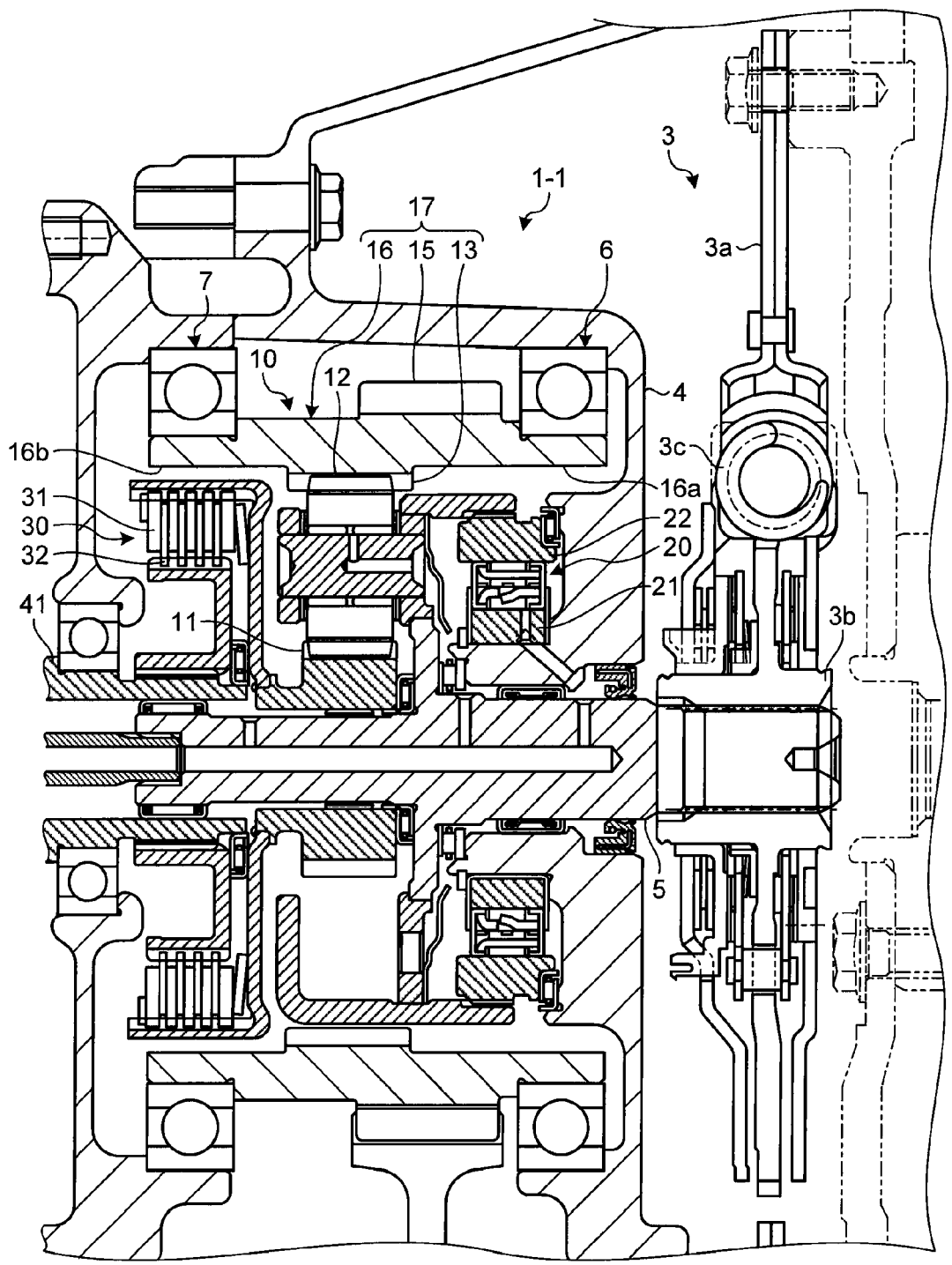
FIG. 2 is a detailed view of a hybrid vehicle drive device of the embodiment.

An embodiment will be explained referring to FIGS. 1 and 2. The embodiment relates to a hybrid vehicle drive device. FIG. 1 is a skeleton view illustrating a main portion of a hybrid vehicle according to the embodiment, and FIG. 2 is a detailed view of the hybrid vehicle drive device of the embodiment.

As shown in FIG. 1, a hybrid vehicle 100 includes an engine 1, a damper 3, a hybrid vehicle drive device 1-1, a first electric rotating machine MG1, and a second electric rotating machine MG2.

A rotating shaft 2 of the engine 1 is connected to an input shaft 5 of the hybrid vehicle drive device 1-1 via the damper 3. The input shaft 5 is rotatably supported coaxially on the rotating shaft 2. The engine 1 converts combustion energy of a fuel to a rotating motion and outputs the rotating motion to the rotating shaft 2. The rotating shaft 2 extends in, for example, a vehicle width direction of the hybrid vehicle 100.

The damper 3 has a plate 3a on an input side, a hub 3b on an output side, and a damper spring 3c. The plate 3a is coupled with the rotating shaft 2 of the engine 1. The hub 3b is coupled with the input shaft 5 of the hybrid vehicle drive device 1-1. The damper spring 3c is interposed between the plate 3a and the hub 3b. A shock and a vibration due to torque variation are absorbed between the engine 1 and the hybrid vehicle drive device 1-1 by the damper 3.

The hybrid vehicle drive device 1-1 includes a planetary gear mechanism 10, a one way clutch 20, and a torque limiter 30. The damper 3, the one way clutch 20, the planetary gear mechanism 10, the torque limiter 30, and the first electric rotating machine MG1 are sequentially disposed coaxially on the rotating shaft 2 of the engine 1 from a side near to the engine 1 in an axis direction of the engine 1.

The planetary gear mechanism 10 is a power dividing planetary gear which divides torque of the engine 1 to drive wheels and the first electric rotating MG1. The planetary gear mechanism 10 is of a single pinion type and has a sun gear 11, a pinion gear 12, a ring gear 13, and a carrier 14. The sun gear 11 is disposed coaxially on the rotating shaft 2. The ring gear 13 is disposed coaxially on the sun gear 11 as well as outside of the sun gear 11 in a radial direction. The pinion gear 12 is interposed between the sun gear 11 and the ring gear 13 and meshed with the sun gear 11 and the ring gear 13, respectively. The pinion gear 12 is rotatably supported by the carrier 14. The carrier 14 is connected to the input shaft 5 and rotates integrally with the input shaft 5. Accordingly, the pinion gear 12 can rotate (revolve) around a central axis of the input shaft 5 together with the carrier 14 as well as can rotate (revolve) around a central axis of the pinion gear 12 by being supported by the carrier 14.

The engine 1 is connected to the carrier 14 of the planetary gear mechanism 10 via the rotating shaft 2, the damper 3, and the input shaft 5. Output torque of the engine 1 is input to the carrier 14 via the rotating shaft 2, the damper 3, and the input shaft 5.

The sun gear 11 is connected to a rotor shaft 41 of the first electric rotating machine MG1 via the torque limiter 30. In other words, the torque limiter 30 is interposed between the sun gear 11 and a rotor 43 of the first electric rotating machine MG1. The first electric rotating machine MG1 has the rotor shaft 41, a stator 42, and the rotor 43. The rotor shaft 41 is a rotating shaft of the rotor 43 and rotates integrally with the rotor 43. The rotor shaft 41 is hollow and the input shaft 5 is inserted thereinto. The rotor shaft 41 extends from the rotor 43 to the engine 1 side in the axis direction, and an end section of the rotor shaft 41 on the engine 1 side is connected to the torque limiter 30.

The torque limiter 30 allows a transmission of torque less than predetermined limit torque and regulates a transmission of torque equal to or more than the limit torque. The torque limiter 30 is, for example, of a friction engagement type in which an engaging member on the input side is friction engaged with an engaging member on the output side. When transmission torque of the input side engaging member and the output side engaging member of the torque limiter 30 becomes equal to or more than the limit torque, the input side engaging member and the output side engaging member generate a slip and relatively rotate, and thereby can regulate a transmission of torque larger than the limit torque.

The ring gear 13 is an internal gear disposed on an inner peripheral surface of a cylindrical rotary member 16. The rotary member 16 is formed in a hollow cylindrical shape and disposed coaxially on the input shaft 5. A counter drive gear 15 is disposed on an outer peripheral surface of the rotary member 16. That is, the ring gear 13 and the counter drive gear 15 constitute a composite gear 17 which is coupled with the one rotary member 16 and rotates integrally therewith.

The counter drive gear 15 is meshed with a counter driven gear 44. Further, the counter driven gear 44 is meshed with a reduction gear 46. The reduction gear 46 is a gear coupled with a rotor shaft 47 of the second electric rotating machine MG2. The second electric rotating machine MG2 has the rotor shaft 47, a stator 48, and a rotor 49. The rotor shaft 47 is a rotating shaft of the rotor 49 and rotates integrally with the rotor 49. A diameter of the reduction gear 46 is smaller than the counter driven gear 44, reduces a rotation of the second electric rotating machine MG2, and transmits the reduced rotation to the counter driven gear 44. The ring gear 13 is connected to the second electric rotating machine MG2 via the counter drive gear 15, the counter driven gear 44, and the reduction gear 46.

A drive pinion gear 45 is disposed coaxially on the counter driven gear 44 and rotates integrally with the counter driven gear 44. Torque of the engine 1 and the first electric rotating machine MG1, which is transmitted from the counter drive gear 15 to the counter driven gear 44, and torque of the second electric rotating machine MG2, which is transmitted from the reduction gear 46 to the counter driven gear 44, are combined and transmitted to the drive pinion gear 45. The drive pinion gear 45 is meshed with a differential ring gear 50. The differential ring gear 50 is connected to an output shaft 52 via a differential mechanism 51. The output shaft 52 is connected to the drive wheels of the hybrid vehicle 100. That is, the ring gear 13 is connected to the drive wheels via the counter drive gear 15, the counter driven gear 44, the drive pinion gear 45, the differential ring gear 50, the differential mechanism 51, and the output shaft 52.

The first electric rotating machine MG1 and the second electric rotating machine MG2 have a function as a motor (electric motor) and a function as a generator, respectively. The first electric rotating machine MG1 and the second electric rotating machine MG2 are connected to a battery via an inverter. The first electric rotating machine MG1 and the second electric rotating machine MG2 can convert electric power supplied from the battery to mechanical power and output the mechanical power as well as can be driven by input power and can convert the mechanical power to the electric power. Electric power generated by the electric rotating machines MG1, MG2 can be stored in the battery. For example, an alternating-current synchronous-type motor generator can be used as the first electric rotating machine MG1 and the second electric rotating machine MG2.

The one way clutch 20 allows a rotation of the carrier 14 in a positive direction and regulates a rotation thereof in a negative direction. Here, the positive direction is a rotation direction of the ring gear 13 when the hybrid vehicle 100 travels forward, and the negative direction is a rotation direction in a direction opposite to the positive direction. That is, the one way clutch 20 can allow a rotation of the carrier 14 in the same direction as a rotation direction of the input shaft 5 when the engine 1 is in operation and can regulate the rotation of the carrier 14 in a direction opposite to the above direction.

An ECU 60 is an electronic control unit having a computer. The ECU 60 is connected to the engine 1, the first electric rotating machine MG1, and the second electric rotating machine MG2, respectively and can control the engine 1 and the electric rotating machines MG1, MG2.

The hybrid vehicle 100 can selectively execute hybrid traveling or EV traveling. The hybrid traveling is a travel mode which causes the hybrid vehicle 100 to travel using at least the engine 1, the first electric rotating machine MG1 or the second electric rotating machine MG2 as a power source. The first electric rotating machine MG1 functions as a reaction force receiver of the engine 1 and transmits torque of the engine 1 from the carrier 14 to the ring gear 13. In the hybrid traveling, the second electric rotating machine MG2 may be used as the power source in addition to the engine 1. Note that, in the hybrid traveling, the second electric rotating machine MG2 may be functioned as a generator and can be also rotated idly in a state without load.

The EV traveling is a travel mode in which the engine 1 is stopped and the hybrid vehicle 100 travels using at least any one of the first electric rotating machine MG1 or the second electric rotating machine MG2 as the power source. Note that, in the EV traveling, at least any one of the first electric rotating machine MG1 or the second electric rotating machine MG2 may be caused to generate power in response to a traveling state, a battery charged state, and the like, or at least any one of the first electric rotating machine MG1 or the second electric rotating machine MG2 may be rotated idly.

A provision of the one way clutch 20 with the hybrid vehicle drive device 1-1 allows the EV traveling to be executed using the first electric rotating machine MG1 as the power source. The one way clutch 20 connects the input shaft 5 and the carrier 14 to a case 4. More specifically, as shown in FIG. 2, an inner ring 21 of the one way clutch 20 is fixed to the case 4, and an outer ring 22 thereof is fixed to the carrier 14. The case 4 is a transaxle case which accommodates a transaxle including the planetary gear mechanism 10, the one way clutch 20, the torque limiter 30, the first electric rotating machine MG1, the second electric rotating machine MG2, the differential mechanism 51, and the like therein. A plurality of sprags are interposed between the inner ring 21 and the outer ring 22. The sprags allow a rotation of the outer ring 22 in the positive direction and regulate a rotation of the outer ring 22 in the negative direction.

The one way clutch 20 regulates a rotation of the carrier 14 in the negative direction. As to torque which tends to rotate the carrier 14 in the negative direction, the case 4 can receive the torque via the one way clutch 20. Accordingly, when the first electric rotating machine MG1 generates negative torque and rotates in the negative direction in a state that the engine 1 has stopped rotation, the first electric rotating machine MG1 can rotate the ring gear 13 in the positive direction and cause the hybrid vehicle 100 to travel forward. At the time, although negative torque is input to the carrier 14, a negative rotation of the carrier 14 is regulated by the one way clutch 20. Accordingly, the case 4 can receive a reaction force with respect to torque of the first electric rotating machine MG1 and transmits torque in the positive direction to the ring gear 13.

Accordingly, in the hybrid vehicle 100 of the embodiment, the EV traveling can be executed by driving both the first electric rotating machine MG1 and the second electric rotating machine MG2. Further, in the EV traveling, three EV traveling modes, that is, a first EV traveling mode which causes the hybrid vehicle 100 to travel using the first electric rotating machine MG1 as a single power source, a second EV traveling mode which causes the hybrid vehicle 100 to travel using the second electric rotating machine MG2 as the single power source, and a third EV traveling mode which causes the hybrid vehicle 100 to travel using the first electric rotating machine MG1 and the second electric rotating machine MG2 as power sources can be selectively executed.

The EV traveling modes are switched by, for example, the ECU 60. The ECU 60 can switch the EV traveling modes based on a vehicle speed, an accelerator open degree, other travel conditions, and the like of the hybrid vehicle 100. Further, the ECU 60 can switch the EV traveling modes based on an efficiency. For example, output torque of the first electric rotating machine MG1 and output torque of the second electric rotating machine MG2 may be determined, respectively based on requested torque and the vehicle speed so that a loss is minimized.

Since the hybrid vehicle 100 of the embodiment has the EV traveling modes, an expansion of the EV travel region up to a high requested torque region, an extension of a cruising range in the EV traveling, and the like become possible. When a drive source of the EV traveling is only the second electric rotating machine MG2, since it is necessary to increase an output of the second electric rotating machine MG2 to increase an output in the EV traveling, the second electric rotating machine MG2 is increased in size. In contrast, the hybrid vehicle 100 of the embodiment can output the output torque of the first electric rotating machine MG1 to the drive wheels in addition to the output torque of the second electric rotating machine MG2. Thus, according to the hybrid vehicle drive device 1-1 of the embodiment, since an output in the EV traveling can be increased without increasing the second electric rotating machine MG2 in size, the EV travel region can be expanded.

Further, when an EV traveling mode having a least loss is selected and torque assigned to the first electric rotating machine MG1 and torque assigned to the second electric rotating machine MG2 are determined with respect to the same requested torque, an efficiency of the EV traveling can be improved and the cruising range can be increased. Accordingly, the hybrid vehicle drive device 1-1 of the embodiment is preferable also as a drive device of a plug-in hybrid (PHV) vehicle.

Here, there is a possibility that excessive torque is input to the one way clutch 20 during the EV traveling. For example, when the EV traveling is performed on a wavy road, it is considered that wheels are bounded and the like and a large amount of negative torque is input from the drive wheels. It is preferable to provide a mechanism which buffers and eases excessive torque input to the one way clutch 20 due to the negative torque and the like.

The hybrid vehicle drive device 1-1 of the embodiment is provided with the torque limiter 30 which can buffer and ease an excessive load of the one way clutch 20. As shown in FIG. 2, the torque limiter 30 has a disc plate 31 on the sun gear 11 side which is connected to the sun gear 11 and a disc plate 32 on the first electric rotating machine MG1 which is connected to the rotor shaft 41. The disc plate 31 on the sun gear 11 side and the disc plate 32 on the first electric rotating machine MG1 side confront with each other in the axis direction. The disc plates 31, 32 are disposed at outermost positions in the radial direction in a space section in the rotary member 16. Specifically, the disc plates 31, 32 are disposed so that an outermost periphery of the disc plate 31 and tooth tips of the ring gear 13 are located at approximately the same positions in the radial direction.

The torque limiter 30 can transmit torque between the sun gear 11 and the first electric rotating machine MG1 by a friction engagement of the disc plate 31 and the disc plate 32. When the torque limiter 30 is input with torque exceeding a predetermined amount of limit torque, the disc plate 31 and the disc plate 32 rotate relatively with each other so as to be able to block a transmission of torque more than the limit torque. That is, when the torque limiter 30 is input with torque exceeding a predetermined torque capacity, the torque limiter 30 rotates idly and can regulate a transmission of the excessive torque.

For example, in the EV traveling mode in which the hybrid vehicle 100 travels using the first electric rotating machine MG1 as the power source, when torque, which is input to the torque limiter 30 by an input of excessive negative torque from the drive wheels, and the like, exceeds the limit torque, the torque limiter 30 operates. Since the transmission of the excessive torque is regulated in a power transmission path of the first electric rotating machine MG1 as the power source and the drive wheels, a load of the one way clutch 20 which is the reaction force receiver is suppressed. That is, the torque limiter 30 can limit that a magnitude of torque input to the one way clutch 20 exceeds maximum torque corresponding to the limit torque of the torque limiter 30. Transmission torque of the torque limiter 30 and transmission torque of the one way clutch 20 have a predetermined correspondence relation based on a gear ratio of the planetary gear mechanism 10. Accordingly, the torque limiter 30 operates in response to the transmission torque of the one way clutch 20 and can restrict the transmission torque of the one way clutch 20. The limit torque of the torque limiter 30 is set based on an allowable value of the one way clutch 20. Accordingly, the torque limiter 30 suppresses that the load of the one way clutch 20 becomes equal to or more than the allowable value is and can appropriately protect the one way clutch 20.

Further, the torque limiter 30 of the embodiment can regulate not only the torque input to the one way clutch 20 but also torque transmitted to the engine 1 via the carrier 14. The transmission torque of the torque limiter 30 and torque transmitted to the carrier 14 via the planetary gear mechanism 10 have a predetermined correspondence relation based on the gear ratio of the planetary gear mechanism 10. Accordingly, the torque limiter 30 operates in response to the torque transmitted to the carrier 14 via the planetary gear mechanism 10 and can restrict the torque transmitted to the carrier 14 via the planetary gear mechanism 10. With the operation, the torque limiter 30 can restrict the transmission torque of the one way clutch 20 and torque transmitted from the carrier 14 to the engine 1. As a result, it can be suppressed that the torque transmitted from the carrier 14 to the engine 1 via the planetary gear mechanism 10 becomes excessive. As described above, the torque limiter 30 cannot only restrict the input torque to the one way clutch 20 but also can regulate an input of excessive torque to the engine 1 in a negative rotation direction.

In the embodiment, the one way clutch 20 and the torque limiter 30 are disposed on an inner diameter side of the composite gear 17, that is, inside of the rotary member 16. As shown in FIG. 2, the rotary member 16 is supported by bearings 6, 7 from outside in the radial direction. The bearing 6 supports a side of the rotary member 16 which is nearer to the engine side than the counter drive gear 15 in the axis direction. The bearing 7 supports a side of the rotary member 16 opposite to the engine side which is nearer to the engine than the counter drive gear 15 in the axis direction. The bearings 6, 7 are disposed to both ends of the rotary member 16 and support the rotary member 16 on both the ends thereof.

The one way clutch 20 is disposed inside of a section 16a in the rotary member 16 nearer to the engine side than the ring gear 13 in the axis direction. In other words, the one way clutch 20 is disposed in the space section formed inside of the section 16a in the rotary member 16 on the engine side in the radial direction and confronts with an inner peripheral surface of the section 16a on the engine side in the radial direction. An end surface of the rotary member 16 on the engine side is positioned nearer to the engine side than an end surface of the one way clutch 20 on the engine side in the axis direction. That is, the one way clutch 20 is positioned inside of the rotary member 16 in its entirety. Note that the one way clutch 20 may be disposed so that at least a part thereof is positioned inside of the rotary member 16. The bearing 6, the section 16a of the rotary member 16 on the engine side, and the one way clutch 20 are disposed so as to be overlapped in the radial direction. In other words, a region in which the bearing 6 is disposed in the axis direction, a region in which the section 16a of the rotary member 16 on the engine side is disposed, and a region in which the one way clutch 20 is disposed have overlapping sections.

The torque limiter 30 is disposed inside of a section 16b in the rotary member 16 on a side opposite to the engine side which is nearer to the engine than the ring gear 13 in the axis direction. In other words, the torque limiter 30 is disposed in a space section formed inside of the section 16b on a side opposite to the engine side in the rotary member 16 in the radial direction. Further, the torque limiter 30 confronts with an inner peripheral surface of the section 16b on the side opposite to the engine side in the radial direction. At least a part of the torque limiter 30 is positioned inside of the rotary member 16 and a part thereof more projects to a side opposite to the engine side than the rotary member 16 in the axis direction. That is, an end surface of the rotary member 16 on a side opposite to the engine side is positioned on a side nearer to the engine side than an end surface of the torque limiter 30 on a side opposite to the engine side in the axis direction. More specifically, at least the disc plates 31, 32 of the torque limiter 30 are disposed at positions that overlap the rotary member 16 in the radial direction. Note that the torque limiter 30 may be disposed inside of the rotary member 16 in its entirety.

Further, the torque limiter 30 and the rotary member 16 are disposed overlapping the bearing 7 in the radial direction. In other words, a region in which the bearing 7 is disposed in the axis direction, a region in which the section 16b of the rotary member 16 on the side opposite to the engine side is disposed, and a region in which the torque limiter 30 is disposed have overlapping sections.

According to the hybrid vehicle drive device 1-1 of the embodiment, the one way clutch 20 and the torque limiter 30 can be disposed while suppressing an increase of the axial length. For example, the axial length from the engine 1 to the first electric rotating machine MG1 can be reduced in comparison with a case that the one way clutch 20 and the torque limiter 30 are disposed in series with the planetary gear mechanism 10. With the configuration, there is an advantage that a mountability of the transaxle can be improved.

Further, according to the hybrid vehicle drive device 1-1 of the embodiment, a diameter of the torque limiter 30 can be increased, and thereby a number of the friction members can be reduced. When the torque limiter 30 is disposed inside of the rotary member 16, the diameter of the torque limiter 30 can be easily increased in comparison with a case that the torque limiter 30 is disposed outside of the rotary member 16. When the torque limiter 30 is disposed outside of the rotary member 16, that is, when, for example, the torque limiter 30 is disposed in series with the rotary member 16, the diameter of the torque limiter 30 tends to be restricted because the torque limiter 30 is disposed so as not to interfere with other member. In contrast, when the torque limiter 30 is disposed inside of the rotary member 16, the diameter of the torque limiter 30 can be increased making use of the space inside of the rotary member 16 to a maximum degree. As a result, there is an advantage that a number of the disc plates 31, 32 and the number of the friction members can be reduced. Further, since the number of the friction members can be reduced, the axial length of the torque limiter 30 can be reduced and an axial length of the hybrid vehicle drive device 1-1 (entire length of the transaxle) can be suppressed.

Further, since a diameter of the one way clutch 20 can be increased, a disengaging type can be easily employed. The one way clutch 20 is disposed inside of the rotary member 16, the diameter of the one way clutch 20 can be increased as compared with a case that the one way clutch 20 is disposed outside of the rotary member 16. Accordingly, the one way clutch 20 can be configured as the disengaging type and a drag loss when the one way clutch 20 rotates idly can be reduced.

Further, according to the hybrid vehicle drive device 1-1 of the embodiment, a torque limiter conventionally disposed to the damper 3 can be omitted. The torque limiter 30 cannot only regulate the input of the excessive torque to the one way clutch 20, but also can regulate the input of the excessive torque to the engine 1. In the hybrid vehicle 100 of the embodiment, since the torque limiter 30 is caused to act also as the torque limiter conventional disposed to the damper 3, the damper 3 has no torque limiter. As a result, an axial length of the transaxle can be suppressed.

Note that, in the embodiment, although the one way clutch 20 is disposed on the engine side with respect to the planetary gear mechanism 10 and the torque limiter 30 is disposed to the side opposite to the engine side with respect to the planetary gear mechanism 10, a disposition of the one way clutch 20 and the torque limiter 30 is not limited thereto. It is sufficient that the one way clutch 20 and the torque limiter 30 are appropriately disposed inside of the rotary member 16.

For example, the one way clutch 20 may be disposed to the side opposite to the engine side with respect to the planetary gear mechanism 10 as long as the one way clutch 20 can regulate a rotation of the carrier 14 in the negative direction. The torque limiter 30 may be optionally disposed as long as the torque limiter 30 operates in response to the transmission torque of the one way clutch 20 and suppresses that the excessive torque is input to the one way clutch 20. The torque limiter 30 is more preferably disposed on the power transmission path so that the torque limiter 30 operates in response not only to the transmission torque of the one way clutch 20, but also to the torque transmitted to the engine 1 via the carrier 14. For example, the torque limiter 30 may be disposed to the engine side together with the one way clutch 20 with respect to the planetary gear mechanism 10. As an example, both the one way clutch 20 and the engine 1 may be connected to the carrier 14 via the torque limiter 30.

In the embodiment, torque assigned to the torque limiter 30 is reduced by connecting the torque limiter 30 to the sun gear 11. Since the torque limiter 30 is disposed to the sun gear 11, input torque to the torque limiter 30 becomes small as compared with a case that the torque limiter 30 is disposed to other rotation elements of the planetary gear mechanism 10 such as the carrier 14 and the ring gear 13. Accordingly, there is an advantage that the torque limiter 30 can be reduced in size, and the like.

In the embodiment, although the hybrid vehicle drive device 1-1 is applied to a multi-shaft type hybrid system in which the first electric rotating machine MG1 and the second electric rotating machine MG2 are disposed on different shafts, the embodiment is not limited thereto and the hybrid vehicle drive device 1-1 may be applied to a single-shaft type hybrid system in which the first electric rotating machine MG1 and the second electric rotating machine MG2 are disposed on the same shaft.

The single-shaft type hybrid system is provided with, for example, two planetary gear mechanisms, and a first planetary gear mechanism is connected with an engine and a first electric rotating machine MG1 and a second planetary gear mechanism is connected with a second electric rotating machine MG2. As an example, the first electric rotating machine MG1 is connected to a sun gear of the first planetary gear mechanism and an engine 1 is connected to a carrier thereof, respectively, and the second electric rotating machine MG2 is connected to a sun gear of the second planetary gear mechanism and a transaxle case is connected to a carrier thereof, respectively. Further, ring gears of the respective planetary gear mechanisms are disposed on an inner peripheral side of a common rotary member as well as a counter drive gear is disposed on an outer peripheral side of the rotary member to thereby constitute a composite gear. An EV travel region can be expanded and an axial length can be suppressed at the same time by disposing a one way clutch and a torque limiter inside of the rotary member of the composite gear.

Contents disclosed in the embodiment can be executed by being appropriately combined.

REFERENCE SIGNS LIST 1-1 HYBRID VEHICLE DRIVE DEVICE
1 ENGINE
10 PLANETARY GEAR MECHANISM
11 SUN GEAR
12 PINION GEAR
13 RING GEAR
14 CARRIER
15 COUNTER DRIVE GEAR
16 ROTARY MEMBER
17 COMPOSITE GEAR
20 ONE WAY CLUTCH
30 TORQUE LIMITER
100 HYBRID VEHICLE

The invention claimed is:

1. A hybrid vehicle drive device comprising:
a planetary gear mechanism;
a one way clutch; and
a torque limiter, wherein
a sun gear of the planetary gear mechanism is connected to a first electric rotating machine, a carrier thereof is connected to an engine, and a ring gear thereof is connected to a second electric rotating machine and drive wheels, respectively,
the ring gear is disposed on an inner peripheral side of a hollow rotary member as well as connected to the drive wheels via a counter drive gear disposed on an outer peripheral side of the rotary member,
the one way clutch regulates a rotation of the carrier in a negative direction when it is assumed that a rotation direction of the ring gear at the time a hybrid vehicle travels forward is a positive direction,
the torque limiter operates in response to transmission torque of the one way clutch and restricts the transmission torque of the one way clutch, and
the one way clutch and the torque limiter are disposed inside of the rotary member.

2. The hybrid vehicle drive device according to claim 1, wherein the torque limiter is interposed between the sun gear and the first electric rotating machine.

3. The hybrid vehicle drive device according to claim 1, wherein the one way clutch, the planetary gear mechanism, and the torque limiter are sequentially disposed from a side near to the engine in an axis direction of the engine.

4. The hybrid vehicle drive device according to claim 1, wherein the torque limiter operates in response to torque transmitted to the carrier via the planetary gear mechanism and restricts the transmission torque of the one way clutch and torque transmitted from the carrier to the engine.

5. The hybrid vehicle drive device according to claim 2, wherein the one way clutch, the planetary gear mechanism, and the torque limiter are sequentially disposed from a side near to the engine in an axis direction of the engine.

* * * * *